United States Patent [19]

Wilkes et al.

[11] Patent Number: 5,046,377

[45] Date of Patent: Sep. 10, 1991

[54] VEHICLE DOOR LATCH AND LIKE ACTUATORS

[75] Inventors: Steven F. Wilkes, Wolverhampton; John F. Dean, Bromsgrove, both of Great Britain

[73] Assignee: Rockwell Automotive Body Systems Ltd, England

[21] Appl. No.: 396,543

[22] Filed: Aug. 21, 1989

[30] Foreign Application Priority Data

Aug. 23, 1988 [GB] United Kingdom ................. 8819943

[51] Int. Cl.[5] ........................ F16H 57/00; F16C 17/02

[52] U.S. Cl. .................................. 74/431; 74/421 R; 384/129

[58] Field of Search .............. 74/431, 421 R; 384/129

[56] References Cited

U.S. PATENT DOCUMENTS 2,145,623 1/1939 Hill ................................ 384/129 X
2,589,534 3/1952 Buttolph ......................... 384/129 X
2,718,442 9/1955 Winter ................................ 384/129
2,828,985 4/1958 Ridenour ........................ 384/129 X

FOREIGN PATENT DOCUMENTS 1120090 4/1956 France ............................... 384/129
944530 12/1963 United Kingdom ................ 384/129
955689 4/1964 United Kingdom ................ 384/129

*Primary Examiner*—Allan D. Herrmann
*Attorney, Agent, or Firm*—Learman & McCulloch

[57] ABSTRACT

Power actuator unit for servo-drive of motor vehicle body closures e.g. centrally controlled door latches and locks, window winders etc and including a power transmitting drive train wherein the latter includes a female bearing surface, e.g. the bore (34) of a boss (30) of a gear wheel or pinion (31) which is a running fit on a complementary male bearing surface e.g. a metal shaft (32). One surface e.g. of the shaft is at constant radius from the axis of relative revolution of the surfaces e.g. is cylindrical; and the other surfaces e.g. the bore (34) is formed to have a plurality of facets or other sections e.g. by being square in diametral cross section to provide line or point contact with the one surface at sufficient angularly spaced locations to ensure true running but the facets or sections not being otherwise in contact with the one surface e.g. of the shaft to prevent orbital "racing" of the one on the other particularly where the wheel etc is axially out of balance and particularly during high speed freewheeling which would otherwise give rise to lack of free movement and unpleasant vibration and noise.

9 Claims, 3 Drawing Sheets

VEHICLE DOOR LATCH AND LIKE ACTUATORS

BACKGROUND OF THE INVENTION

1. Technical Field

This invention relates to power actuators for servo operation of motor vehicle body closures. One common application of the invention will be in the form of powered actuators for remotely controlled locking and unlocking of vehicle passenger and driver's door latches e.g. as part of a central locking system; but the invention also extends to actuators for body closure of a vehicle other than the passenger or driver'doors, for example locking actuators attached to/or integrated into latch assemblies for vehicle boots or "hatchback" lids, sun roofs, bonnets and/or petrol or other filler lids or flaps; and/or to power actuators for movement or other operation of the closures themselves, for example, opening and closing vehicle windows and/or sunroofs.

2. Description of the Prior Art

There is an increasing demand for facilities and equipment on vehicles, even at the lower end of the volume production market, which provide ease of operation and added security, thus power actuators are required which are economical to manufacture and install, of simple construction, and reliable and durable in use. Limitations of the space available for installation, e.g. within vehicle doors and the desirability of avoiding unnecessary weight for greater vehicle efficiency gives rise to a demand for actuators which are compact and which utilise lightweight components even for their moving parts, for example moulded plastics gear wheels.

Due to the above factors the power unit most commonly employed in these actuators is a miniature rotary electrical motor operating at fairly high speed through a step-down gear train, commonly made up of lightweight plastics gear wheels, so as to provide the necessary torque and power output for reliable operation. Often the actuator mechanism includes provision for converting the rotary motion of the motor to linear motion of e.g. a push-pull plunger which is operatively linked to the part or parts of the body closure to be shifted, e.g. for locking and unlocking a door latch. Normally there is also provision for manual operation which commonly involves shifting the push-pull plunger with the associated drive gear train in a free-wheeling condition, i.e. on manual operation at lest some of the gear wheels in the train will be spun at relatively high speeds without carrying any substantial load.

It is most desirable that the rotating components should run freely both for power operation and in the manually induced "free-wheeling" mode for quiet and efficient operation and t avoid undue strain and wear and tear and the object of the invention is to provide a power actuator unit which meets the above requirements in a particularly simple and effective way without adding to its size, cost or complexity and which will ensure constant and efficient operation long term without servicing or maintenance and in the most adverse climatic conditions of heat or cold.

A problem which is prevalent and which has not hitherto been satisfactorily overcome in this type of actuator unit is the phenomenon hereinafter referred to as "racing" which will now be explained as follows:

Referring to FIG. 1 of the accompanying drawings a rotary drive component of a power actuator unit, for example a plastics gear wheel 10 is shown diagrammatically. The wheel has a central boss 12 defining a female bearing formation in the form of a cylindrical through bore 14 co-axial of the wheel.

Bore 14 is a running fit on a co-acting male bearing formation being a cylindrical metal tube shaft 16 fixed in a mounting being a body, casing or chassis (not shown) of the actuator unit.

Boss 12 may be regarded as an annulus having an internal diameter D riding on the shaft 16 which has an external diameter d which will be slightly less than D to provide the necessary running clearance (the difference in the diameter is shown greatly exaggerated in FIG. 1).

If wheel 10 is spun rapidly on shaft 16 particularly under free-wheeling no-load or very lightly loaded conditions there is a tendency for said annulus to ride round the shaft as if the latter was a toothed pinion meshed with an annular internally toothed gearwheel i.e. without slipping or sliding on the shaft periphery, the annulus swinging round the shaft int he manner of a "Hula-Hoop" causing a centrifugal force acting on a single contact point or line P which progresses round the shaft periphery.

When this "racing" effect takes place there is effectively an "harmonic drive" relating orbiting of the annulus to its swinging around the shaft by the formula $$1:\left(\frac{D}{d}\right)-1$$

assuming that no sliding takes place at point P.

If, as will be the case where a shaft is a running fit in an annulus, D and d are close in size, the overall ratio is very high so that even if wheel 10, i.e., the annulus, is being driven for rotation at only moderately fast speeds, very high speed orbiting of the annulus can occur. The higher the speed of said orbiting, the greater the centrifugal force at the contact point P increasing the resistance to sliding and thus further ensuring continuance and build-up of the "racing".

The facing effect will be amplified if the rotating component such as gear wheel 19 is out of balance viewed in the axial direction along the shaft; such a condition is illustrated in FIG. 2 of the accompanying drawings where an annular boss 12*a* forms part of a bell-shaped component having a larger diameter portion 20 which projects axially from the boss and which is not directly supported or located on the shaft, its center of gravity (indicated at "C of G" on the drawing) being beyond the boss 12*a*.

Again, the out of balance effect is greatly exaggerated in FIG. 2, but it will be seen that the "racing" may take place with the non-slipping contact at very localised opposing positions A, B where the internal corners of the boss or annulus at its opposite ends engage opposite sides of the shaft periphery diagonally so that the component follows a conical envelope of revolution on the shaft with little or no slipping at said corner contact points.

The "racing" effect acts surprisingly powerfully to restrict or brake free rotation of the components on the shaft and causes unpleasant and noticeable vibrations accompanied by a whirring or buzzing noise which will often be amplified due the actuator unit being mounted within hollow portions of the vehicle body, such as the void within a door, and in contact, directly or indirectly, with metal door or other panels which may also resonate.

Some shapes of components are more susceptible to "racing" than others and in practice the presence or absence of the effect is found to be unpredictable. A batch of actuator units all made to the same design and tolerances may include some which operate quietly without "racing" and others in which the effect is so noticeable as to call for rejection. Hitherto, the only attempts made to avoid or mitigate this effect have been by manufacturing the components to extremely high tolerances and with highly polished and finished bearing surfaces so adding to manufacturing cost and quality control requirements; using specialised low friction materials, e.g. low friction plastics, which again adds to costs and may cause other problems as these materials may have disadvantages in other respects, e.g. as to durability, stability etc; and/or trying to ensure adequate and long term lubrication of the moving surfaces.

The latter expedient is most commonly employed but is not successful in practice, the choice of an appropriate lubricant is extremely difficult—a thick lubricant such as a grease may itself hinder effective operation of the actuator and will tend to deteriorate and become thicker with the passage of time, while a thin lubricant such as a light oil is quickly dispersed from the bearing surfaces due to their running pressures and "creep" as well as evaporation e.g. in hot conditions. Moreover the presence of lubricant can cause dust and dirt to collect on the bearing surfaces which will eventually cause excessive wear and increased friction. Motor vehicles have to operate under extremes of temperature and under winter conditions lubricant will tend to solidify and could even completely block operation of the actuator unit.

SUMMARY OF THE INVENTION

According to the invention there is provided a power actuator unit for servo operation of motor vehicle body closures. The unit includes a drive train for transmitting power from an actuator motor of the unit to an output element wherein the train includes a female bearing surface which is a running fit on a complementary male bearing surface. One surface is at constant radius from the axis of relative revolution of the surfaces and the other of the surfaces is formed to have a plurality of facets or other sections not at constant radius from the axis to provide line or point contact with the one surface at sufficient angularly spaced locations to ensure that the bearing surfaces run substantially true to each other. The sections or facts not being otherwise in contact with the one surface.

The male bearing surface may be the one at constant radius, for example it may take the form of a cylindrical metal or other shaft. The female bearing surface may be the one having the plurality of sections or facets, for example it may take the form of a square or other polygonal section bore running on the shaft or other male bearing surface.

The bearing surfaces may be of constant section axially or may vary in section complementary to each other in the axial direction e.g. by being conically tapered and/or stepped.

The sections or facets may extend rectilinearly along the axial length of the other surface or may be twisted or lie diagonally therealong so that there is helical line contact with the one surface.

THE DRAWINGS

Some examples of the invention will now be more particularly described with reference to the accompanying drawings wherein:

FIGS. 1 and 2 are illustrations of known forms of actuator components as referred to above;

FIGS. *3a,b* are a diagrammatic diametral section of components of an actuator unit and their path of movement embodying the invention;

FIG. *6a,b,c* and *d* are diagrammatic diametral sections of components incorporating some alternative forms of the invention.

DESCRIPTION OF THE PREFERRED EMBODIMENTS

Figure 3A:
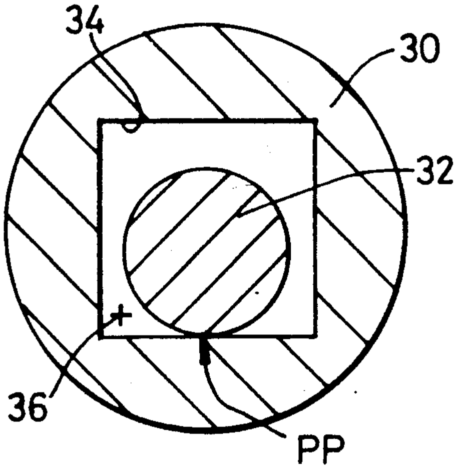
Figure 4:
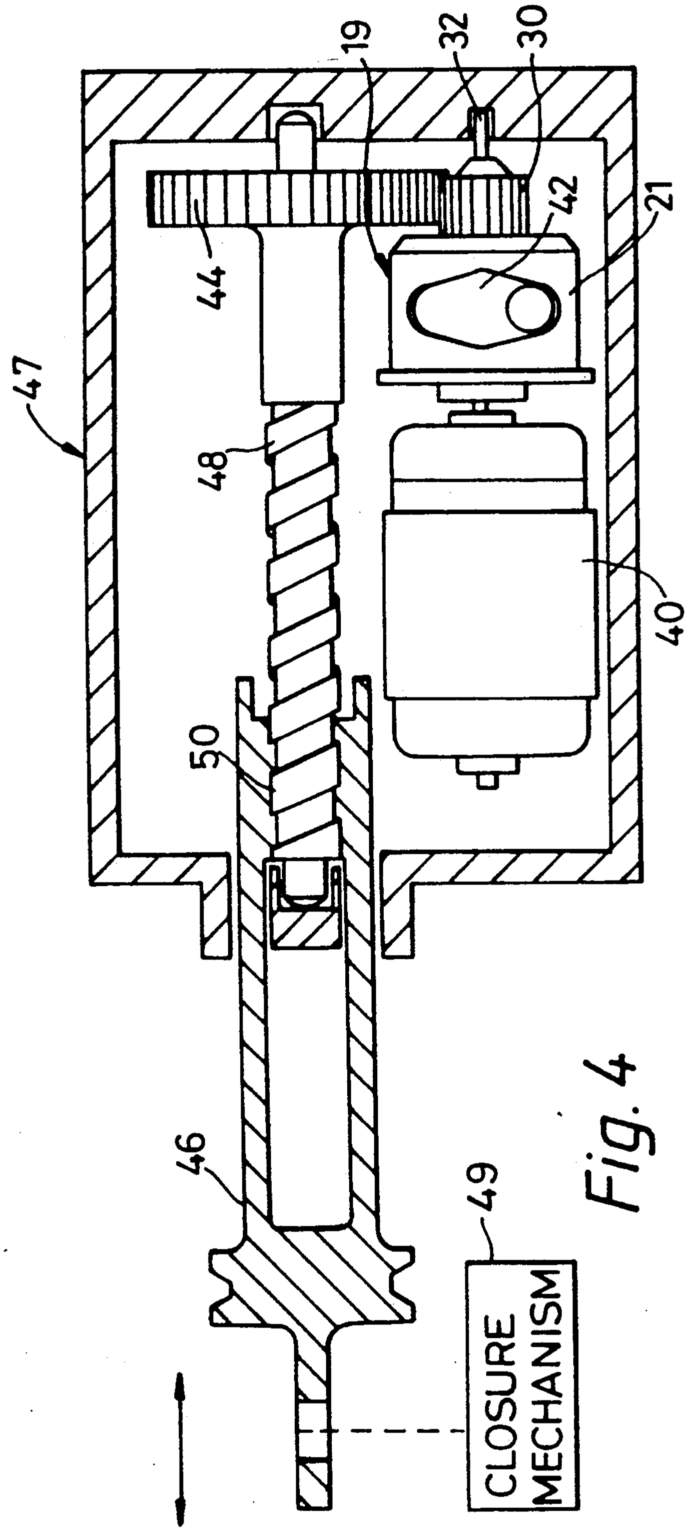
FIG. 4 is a sectional view of an actuator unit incorporating the components of FIG. 3.

Referring firstly to FIG. 3*a* and *b*, a rotating annular component of an actuator is further described below (and shown in FIG. 4 in more detail). The boss 30 of a drive train gear wheel or pinion of the actuator is journalled for free rotation on a cylindrical metal shaft 32. The component 30 is conveniently a moulding of plastics material and it is provided with a central through bore 34 forming a female bearing surface which is a running fit on the male bearing surface consisting of the periphery of shaft 32.

Figure 1:
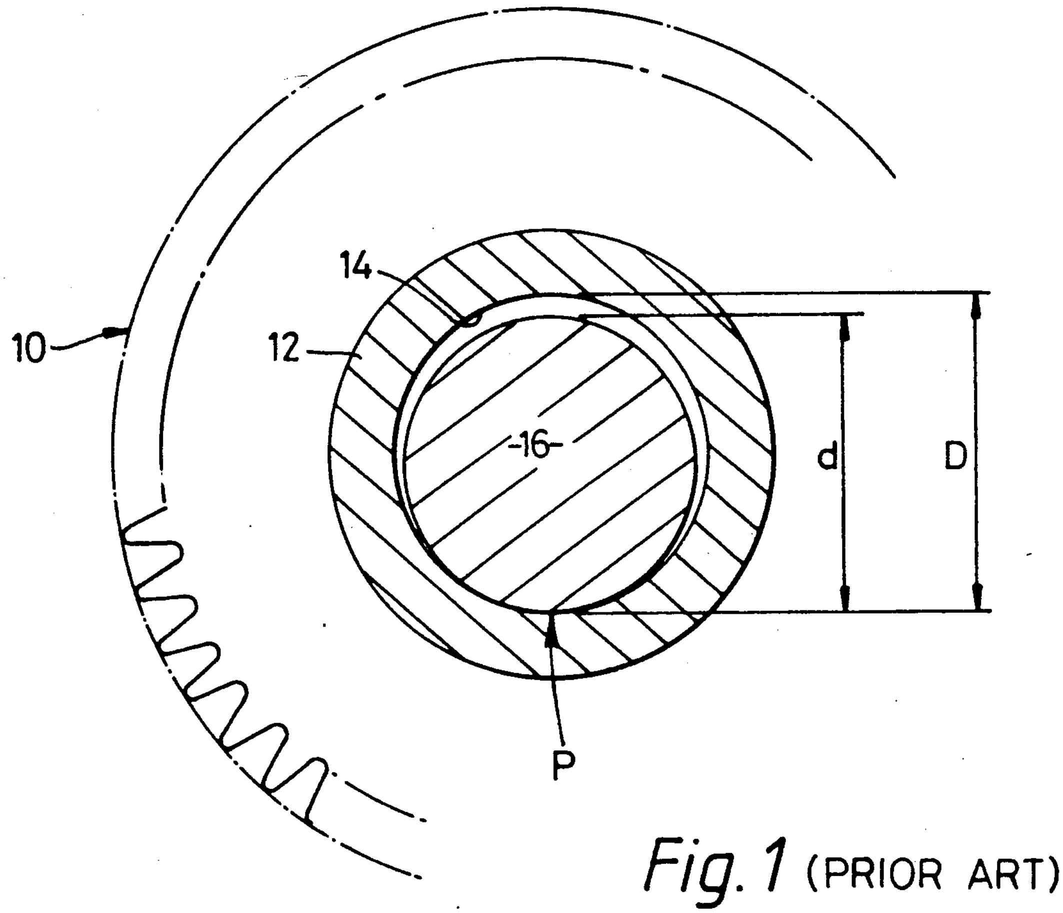
Fig. 1 (PRIOR ART)
Figure 3B:
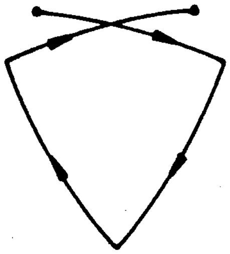
Figure 6A:
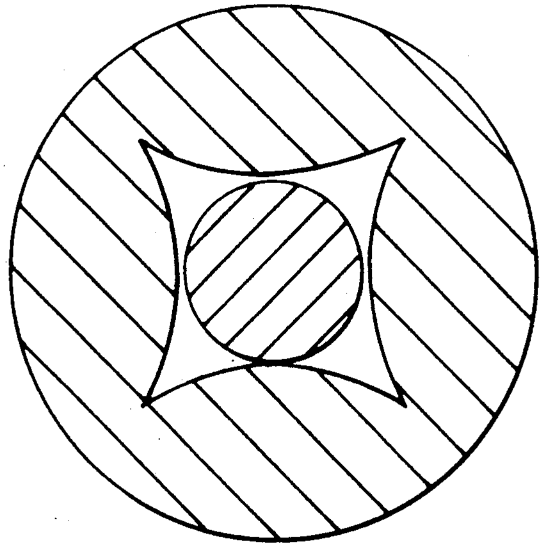
Figure 6B:
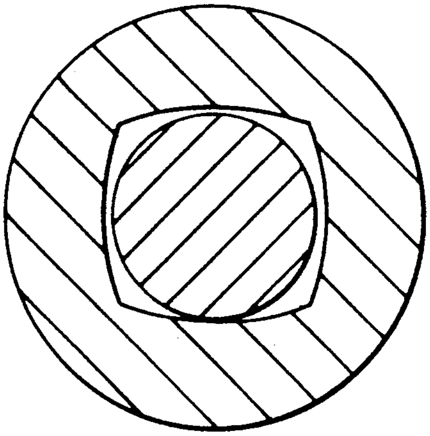
Figure 6C:
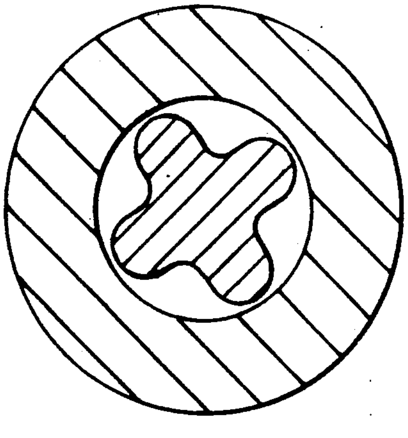
Figure 6D:
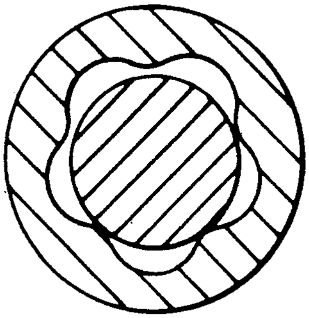

With conventional construction the female bore would be cylindrical as referred to with reference to FIG. 1. In this case, it is square in diametral section, the length of the sides of the square being very slightly greater than the diameter of the shaft (the clearance between them is shown greatly exaggerated in FIG. 3) by an amount to permit running clearance. Thus there can be only line contact between the shaft and the boss at the centers of each of the sides of the square, i.e., at four equi-angular positions about the shaft axis, and with the square bore defining substantial voids 36 at the corners of the square between said lines of contact.

This arrangement eliminates the "racing" effect as it is impossible for the boss or annulus to swing round the shaft on contact point on line PP in the regular "harmonic drive" manner described with reference to FIG. 1. The annulus will pivot on each line contact of the successive sides of the square in turn so that it will have a non-circular orbit of the kind indicated diagrammatically in FIG. 3*b* and the "hoola-hoop" or internally toothed gear ring effect cannot take place.

The above arrangement ensures that the wheel or pinion 34 or other component will spin freely on the shaft at any speed and without the braking and consequent extra loading caused by "racing"; and without any objectionable vibration or noise.

Lubrication of the bearing surfaces of the invention may be quite unnecessary, and indeed undesirable in some applications. However, if lubrication is wanted the voids at the corners of the square bore provide reservoirs which will hold lubricant without being subjected to pressures which will expel it axially from the bore and bearing surfaces. Thus it will remain to be distributed gradually and over a long period of time to the shaft periphery and line contact areas of the annulus. The shear loading due to the presence of grease or other lubricant will be less as the area in close shear; i.e., where there is contact or minimal spacing between the relatively moving bearing surfaces is substantially less in the case of the square bore than where a cylindrical shaft is a running fit within a closely dimensioned cylindrical bore. Thus, even if a heavier lubricant such as a grease is used, the resistance to rotation and hence loading of the components of the actuator will be substantially reduced.

Figure 5:
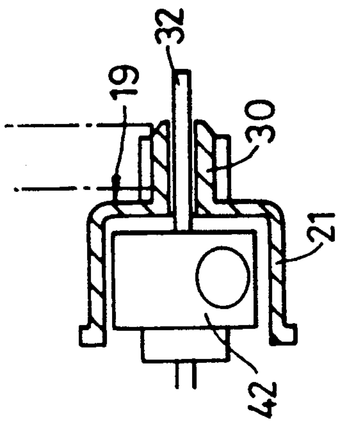
FIG. 5 is a sectional detail of part of FIG. 4.

The invention is particularly advantageous where the actuator drive train is subjected to reverse drive in a high speed free-wheeling condition when the locking or other operation is effected manually. FIGS. 4 and 5 illustrate a vehicle door locking actuator for powered (e.g., in a central locking system) or manual operation.

Figure 2:
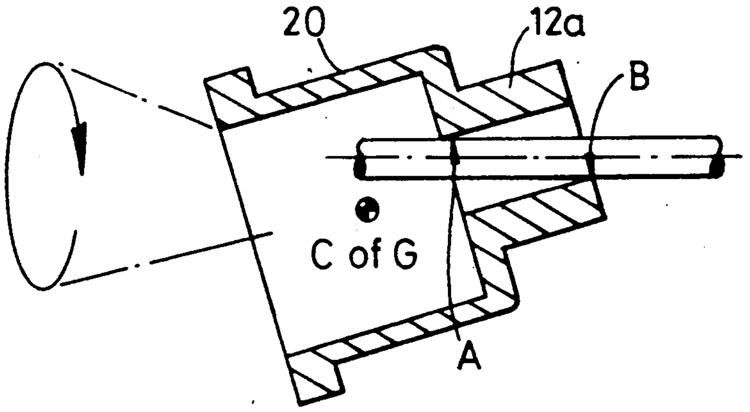
Fig. 2 (PRIOR ART)

The actuator is generally of known kind apart from the incorporation of the invention. It comprises a miniature high speed electric motor 40 whose output shaft 32 carries a transmission clutch device 42. This device co-acts with a rotary input element 19 comprising co-axial bell-shaped cage 21 of the kind shown in FIG. 2 fast with a smaller diameter pinion 30 forming a boss which is a running fit on a distal end portion of shaft 32. As described with reference to FIG. *3a*, pinon 30 embodies the invention by being provided with a square section through bore. Pinion 30 is in operative mesh with a much larger gear wheel 44. A movable output element in the form of a push-pull actuator plunger 46, which will be operatively linked at one end to door lock closure mechanism (shown schematically as 49) is guided for rectilinear movement in the wall of a housing 47 of the actuator which encloses the actuator mechanism.

A worm screw shaft 48 which carries gear wheel 44 is journalled in housing 47 and an internally threaded nut portion 50 of the inner end of plunger 46 is engaged therewith so that rotation of shaft 48 causes rectilinear shifting of plunger 46.

When motor 40 is powered, clutch device 42 transmits rotary motion to the cage 21, so that pinion 30 and shaft 32 rotate together, driving wheel 44.

The arrangement of device 42 is such that on manual shifting of plunger 46, which will transmit rapid rotation to pinion 30, element 19 will spin on shaft 32 without any transmission of power back to said shaft; i.e. motor 40 remains at rest. In this condition, element 19 will be revolved at high speed under little or no loading, a condition which is particularly likely to give rise to "racing" with conventional constructions where as in this case the element is axially unbalanced (see FIG. 2. Indeed the resistance to free movement so caused may even be sufficient to damage the actuator unless the components are formed to be much stronger than need otherwise be the case.

The use of the invention eliminates these problems in a particularly simple and effective way without any substantial redesign of the actuator units or increase in manufacturing costs.

It will be appreciated that the invention may take various forms. Thus for some applications a triangular bore providing line contact at three equi-angular positions may be sufficient and effective, or the bore could be formed with five or more planar or non-planar sides, sections or facets. Indeed almost any regular or irregular right or other sectional polygonal shape of cross-section could be used. However the square section is considered to be probably the most effective and convenient for both operation and manufacture.

It is also to be understood that instead of the male component having the cylindrical or other continuous concentric bearing surface it could be sectioned or faceted e.g. of square cross-section, to co-act with a cylindrical or other continuously concentric female bearing surface. This may possibly be advantageous where the shaft is rotating within a fixed annulus e.g. a gear train wheel has a tube shaft rotating therewith which runs in a bore of a fixed bearing formation.

The facts or sections may be curved e.g. convex or concave as, for example, shown in FIGS. *6a* or *6b* or the facets or sections giving the line or point contact may be in the form of curvilinear lobes or the like as shown, for examples, in FIG. *6c* or *6d*. (FIG. *6c* also shows the male component (shaft) as lobed, with the female component or annulus having the cylindrical bearing surface).

The facets or sections may run rectilinearly the length of the bearing surface in the axial direction or they may run helically or otherwise at an angle thereto so that the line contact has a spiral component along the co-acting bearing surface.

We claim:

1. A power actuator unit for selective servo operation of a motor vehicle body closure which is also subjected to selective non-servo-operation in use, said unit including a high speed electric actuator motor, a movable output element to be coupled to the closure in use, and drive transmission means comprising a step down gear train acting between a rotary input element powered by said motor and said output element to convert high speed low torque power input from said motor to low speed high torque power output for positive servo movement of said output element in use, and a clutch device acting between said motor and said rotary input element operating to apply loading from said motor to said gear train but disconnecting said motor from loading in the opposite sense whereby free wheeling rotation of said gear train including said input element relative to said motor takes place on movement of said output element during said non-servo-operation of the closure, said rotary input element having a female bearing surface which is a running fit on a complementary male bearing surface, one of said surfaces being at a constant radius from the axis of relative revolution of said surface and the other of said surfaces being formed to having a plurality of facets or other sections not at constant radius from said axis to provide line or point contact with said one of said surfaces at sufficient angularly spaced locations to ensure that said bearing surfaces run substantially true to each other, said sections or facets not being otherwise in contact with said one of said surfaces for unrestricted high speed freewheel running of said input element on said male bearing surface.

2. An actuator unit as in claim 1 characterised in that the male bearing surface (32) is the one at constant radius and the female bearing surface is the one having the plurality of facets or sections (34).

3. An actuator unit as in claim 2 characterised in that the male bearing surface is the periphery of a cylindrical shaft.

4. An actuator unit as set forth in claim 3 wherein said shaft is a shaft of the actuator motor which also carries such clutch device.

5. An actuator unit as set forth in claim 4 wherein said rotary input element is a plastics element including a small diameter pinion of said gear train constituting a boss defining a bore whose interior wall is said female bearing surface.

6. An actuator unit as set forth in claim 5 wherein said input element includes an increased diameter cage of said clutch device carried on said boss whereby said element is out of balance in the axial direction with its center of gravity being axially beyond said boss.

7. An actuator unit as in claim 2 characterized in that the female bearing surface defines a polygonal section for running on the male bearing surface.

8. An actuator unit as set forth in claim 7 characterized in that said polygonal section bore of said female bearing surface defines a square.

9. A power actuator unit as in claim 1 characterised in that the bearing surfaces are of constant section axially.

* * * * *

UNITED STATES PATENT AND TRADEMARK OFFICE
CERTIFICATE OF CORRECTION

PATENT NO. : 5,046,377

DATED : September 10, 1991

INVENTOR(S) : Steven F. Wilkes and John F. Dean

It is certified that error appears in the above-identified patent and that said Letters Patent is hereby corrected as shown below:

Column 1, line 12, change "closure" to -- closures --; line 13, change "driver'" to -- driver's --; line 36, change "electrical" to -- electric --; line 48, change "lest" to -- least --; line 55, change "t" to -- to --.

Column 2, line 6, change "tube" to -- stub --; line 20, change "int he" to -- in the --; line 43, change "facing" to -- racing --; line 44, change "19" to -- 10 --; line 54, before "take" insert -- then --.

Column 3, line 9, before "rejection" insert -- their --; line 52, change "facts" to -- facets --.

Column 4, line 44, change "on", second occurrence, to -- or --.

UNITED STATES PATENT AND TRADEMARK OFFICE
CERTIFICATE OF CORRECTION

PATENT NO. : 5,046,377

DATED : September 10, 1991

INVENTOR(S) : Steven F. Wilkes and John F. Dean

It is certified that error appears in the above-identified patent and that said Letters Patent is hereby corrected as shown below:

Column 5, line 62, change "sectional" to -- section --.

Column 6, line 5, change "tube" to -- stub --; line 7, change "facts" to -- facets --; line 43, change "surface" to -- surfaces --; line 44, change "having" to -- have --.

Signed and Sealed this

Twenty-second Day of December, 1992

*Attest:*

DOUGLAS B. COMER

*Attesting Officer*

*Acting Commissioner of Patents and Trademarks*

US005046377C1

(12) EX PARTE REEXAMINATION CERTIFICATE (7947th)

United States Patent (10) Number: US 5,046,377 C1

Wilkes et al. (45) Certificate Issued: Dec. 28, 2010

(54) VEHICLE DOOR LATCH AND LIKE ACTUATOR

(75) Inventors: Steven F. Wilkes, Wolverhampton (GB); John F. Dean, Bromsgrove (GB)

(73) Assignee: Arvinmeritor Light Vehicle Systems (UK) Limited, Stirchley, Birmingham (GB)

Reexamination Request:
No. 90/006,932, Feb. 10, 2004

Reexamination Certificate for:

| | |
|---|---|
| Patent No.: | **5,046,377** |
| Issued: | **Sep. 10, 1991** |
| Appl. No.: | **07/396,543** |
| Filed: | **Aug. 21, 1989** |

Certificate of Correction issued Dec. 22, 1992.

(30) Foreign Application Priority Data

Aug. 23, 1988 (GB) ............................................ 8819943

(51) Int. Cl.
*E05B 65/12* (2006.01)
*E05B 17/00* (2006.01)

(52) U.S. Cl. ......................... 74/431; 384/129; 74/421 R

(58) Field of Classification Search ........................ None
See application file for complete search history.

(56) References Cited

U.S. PATENT DOCUMENTS 3,929,392 A * 12/1975 Ogino ........................ 384/215
4,432,659 A 2/1984 Tuckey
4,520,914 A * 6/1985 Kagiyama et al. ............. 192/71
4,736,829 A 4/1988 Noel

FOREIGN PATENT DOCUMENTS

| | | |
|---|---|---|
| DE | 29 52 241 | * 7/1981 |
| FR | 1120090 | 4/1956 |
| GB | 2 021 707 | * 12/1979 |

OTHER PUBLICATIONS

*Webster's Dictionary of the English Language,* Publishers International Press, New York, 1977.

* cited by examiner

*Primary Examiner*—Peter C. English

(57) ABSTRACT

Power actuator unit for servo-drive of motor vehicle body closures e.g. centrally controlled door latches and locks, window winders etc and including a power transmitting drive train wherein the latter includes a female bearing surface, e.g. the bore (34) of a boss (30) of a gear wheel or pinion (31) which is a running fit on a complementary male bearing surface e.g. a metal shaft (32). One surface e.g. of the shaft is at constant radius from the axis of relative revolution of the surfaces e.g. is cylindrical; and the other surfaces e.g. the bore (34) is formed to have a plurality of facets or other sections e.g. by being square in diametral cross section to provide line or point contact with the one surface at sufficient angularly spaced locations to ensure true running but the facets or sections not being otherwise in contact with the one surface e.g. of the shaft to prevent orbital "racing" of the one on the other particularly where the wheel etc is axially out of balance and particularly during high speed freewheeling which would otherwise give rise to lack of free movement and unpleasant vibration and noise.

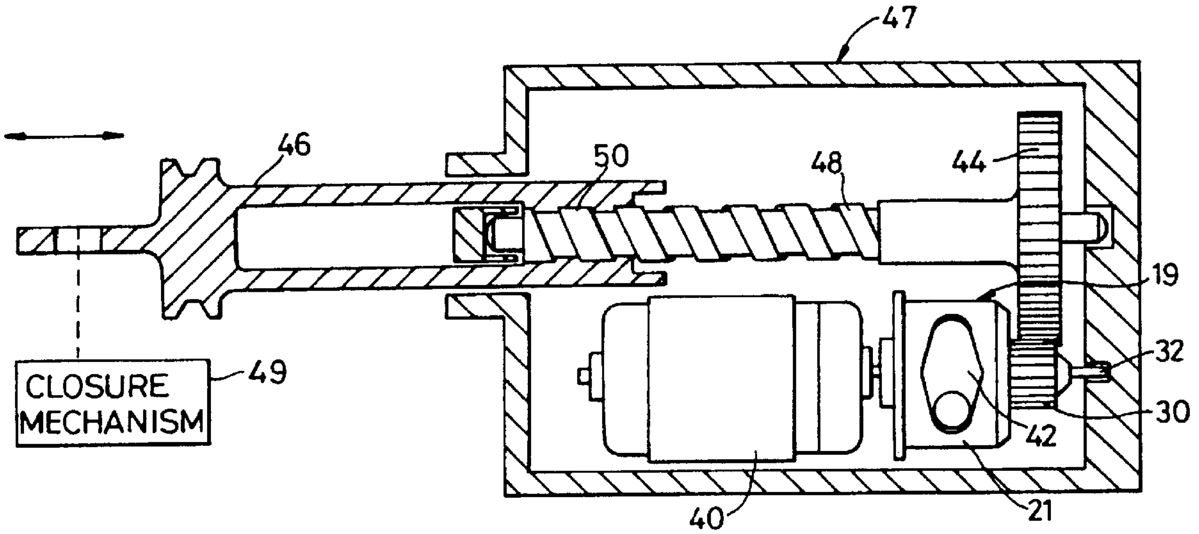

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

Claims 1-9 are cancelled.

* * * * *